(12) United States Patent
Hetzler et al.

(10) Patent No.: US 11,803,648 B2
(45) Date of Patent: Oct. 31, 2023

(54) KEY IN LOCKBOX ENCRYPTED DATA DEDUPLICATION

(71) Applicant: International Business Machines Corporation, Armonk, NY (US)

(72) Inventors: Steven Robert Hetzler, Los Altos, CA (US); Wayne C. Hineman, San Jose, CA (US); John Stewart Best, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 148 days.

(21) Appl. No.: 17/115,903

(22) Filed: Dec. 9, 2020

(65) Prior Publication Data

US 2022/0179974 A1 Jun. 9, 2022

(51) Int. Cl.
| | | |
|---|---|---|
| *G06F 21/60* | (2013.01) | |
| *G06F 16/215* | (2019.01) | |
| *H04L 9/14* | (2006.01) | |
| *H04L 9/08* | (2006.01) | |

(52) U.S. Cl.
CPC .......... *G06F 21/602* (2013.01); *G06F 16/215* (2019.01); *H04L 9/0861* (2013.01); *H04L 9/0894* (2013.01); *H04L 9/14* (2013.01)

(58) Field of Classification Search
CPC ... G06F 21/602; G06F 16/215; H04L 9/0861; H04L 9/0894; H04L 9/14
USPC ........................................................ 713/193
See application file for complete search history.

(56) References Cited

U.S. PATENT DOCUMENTS

| | | | |
|---|---|---|---|
| 8,930,686 B2 | 1/2015 | Augenstein et al. | |
| 8,996,881 B2 | 3/2015 | Fiske et al. | |
| 9,037,856 B2* | 5/2015 | Bestler | ................. H04L 9/3239 |
| | | | 713/167 |
| 9,195,851 B1* | 11/2015 | Chandra | ............... H04L 9/0825 |
| 9,336,092 B1* | 5/2016 | Li | ......................... G06F 21/602 |
| 11,374,773 B2* | 6/2022 | Kreft | ....................... G09C 1/00 |
| 2009/0268903 A1 | 10/2009 | Bojinov et al. | |
| 2010/0070715 A1 | 3/2010 | Waltermann et al. | |

(Continued)

OTHER PUBLICATIONS

Storer et al., "Secure data deduplication", StorageSS'08, Oct. 31, 2008, Fairfax, Virginia, ACM, 10 pages.

(Continued)

*Primary Examiner* — Kambiz Zand
*Assistant Examiner* — Phuc Pham
(74) *Attorney, Agent, or Firm* — Jared C. Chaney

(57) ABSTRACT

A method, system, and computer program product for key in lockbox encrypted data deduplication are provided. The method collects a set of deduplication information by a host in communication with a storage system via a communications network. A fingerprint is generated for a data chunk to be stored on a storage system. The method encrypts the data chunk using a first encryption key to generate an encrypted data chunk. The fingerprint is encrypted with a second encryption key to generate an encrypted fingerprint. The method encrypts the first encryption key with a third encryption key to generate a first encrypted key. The method encrypts the first encryption key with a fourth encryption key to generate a second encryption key. A data package is generated for transmission to the storage system. The method transmits the data package to the storage system.

20 Claims, 9 Drawing Sheets

(56) References Cited

U.S. PATENT DOCUMENTS

| | | | |
|---|---|---|---|
| 2014/0143823 A1* | 5/2014 | Manchester | H04L 65/80 725/116 |
| 2017/0123710 A1* | 5/2017 | Fisher | G06F 3/0644 |
| 2018/0225179 A1 | 8/2018 | Donaghy et al. | |
| 2019/0149332 A1* | 5/2019 | Rivain | H04L 9/0822 713/168 |
| 2020/0320046 A1* | 10/2020 | Narayanamurthy | G06F 16/215 |

OTHER PUBLICATIONS

Shafagh et al., "Towards blockchain-based auditable storage and sharing of iot data", Proceedings of the 2017 on Cloud Computing Security Workshop, Nov. 2017, 6 pages.

Puzio et al., "ClouDedup: Secure deduplication with encrypted data for cloud storage", 2013 IEEE 5th International Conference on Cloud Computing Technology and Science, vol. 1. IEEE, 2013, 8 pages.

Mell et al., "The NIST Definition of Cloud Computing", Recommendations of the National Institute of Standards and Technology, Special Publication 800-145, Sep. 2011, 7 pages.

Hetzler et al., "Multi-Key Encrypted Data Deduplication", U.S. Appl. No. 16/938,459, filed Jul. 24, 2020.

\* cited by examiner

KEY IN LOCKBOX ENCRYPTED DATA DEDUPLICATION

BACKGROUND

Computing devices use encryption in varying communication operations across a communications network. Storage devices and systems perform deduplication operations to eliminate duplicate or redundant information to improve storage utilization. Data deduplication is also used in network communications to reduce data transmitted over a given network.

SUMMARY

According to an embodiment described herein, a computer-implemented method for key in lockbox encrypted data deduplication and transmission is provided. The method collects a set of deduplication information by a host in communication with a storage system via a communications network. A fingerprint is generated for a data chunk to be stored on a storage system. The method encrypts the data chunk using a first encryption key to generate an encrypted data chunk. The fingerprint is encrypted with a second encryption key to generate an encrypted fingerprint. The method encrypts the first encryption key with a third encryption key to generate a first encrypted key (e.g., lockbox). The method encrypts the first encryption key with a fourth encryption key to generate a second encrypted key (e.g., lockbox). A data package is generated for transmission to the storage system. The data package includes at least one of the deduplication information, the encrypted data chunk, the encrypted fingerprint, the first encrypted key, and the second encrypted key. The method transmits the data package to the storage system.

According to an embodiment described herein, a system for key in lockbox encrypted data deduplication and transmission is provided. The system includes one or more processors and a computer-readable storage medium, coupled to the one or more processors, storing program instructions that, when executed by the one or more processors, cause the one or more processors to perform operations. The operations collect a set of deduplication information by a host in communication with a storage system via a communications network. A fingerprint is generated for a data chunk to be stored on a storage system. The operations encrypt the data chunk using a first encryption key to generate an encrypted data chunk. The fingerprint is encrypted with a second encryption key to generate an encrypted fingerprint. The operations encrypt the first encryption key with a third encryption key to generate a first encrypted key. The operations encrypt the first encryption key with a fourth encryption key to generate a second encrypted key. A data package is generated for transmission to the storage system. The data package includes at least one of the deduplication information, the encrypted data chunk, the encrypted fingerprint, the first encrypted key, and the second encrypted key. The operations transmit the data package to the storage system.

According to an embodiment described herein, a computer program product for key in lockbox encrypted data deduplication and transmission is provided. The computer program product includes a computer-readable storage medium having program instructions embodied therewith, the program instructions being executable by one or more processors to cause the one or more processors to collect a set of deduplication information by a host in communication with a storage system via a communications network. A fingerprint is generated for a data chunk to be stored on a storage system. The computer program product encrypts the data chunk using a first encryption key to generate an encrypted data chunk. The fingerprint is encrypted with a second encryption key to generate an encrypted fingerprint. The computer program product encrypts the first encryption key with a third encryption key to generate a first encrypted key. The computer program product encrypts the first encryption key with a fourth encryption key to generate a second encrypted key. A data package is generated for transmission to the storage system. The data package includes at least one of the deduplication information, the encrypted data chunk, the encrypted fingerprint, the first encrypted key, and the second encrypted key. The computer program product transmits the data package to the storage system.

DETAILED DESCRIPTION

Figure 1:
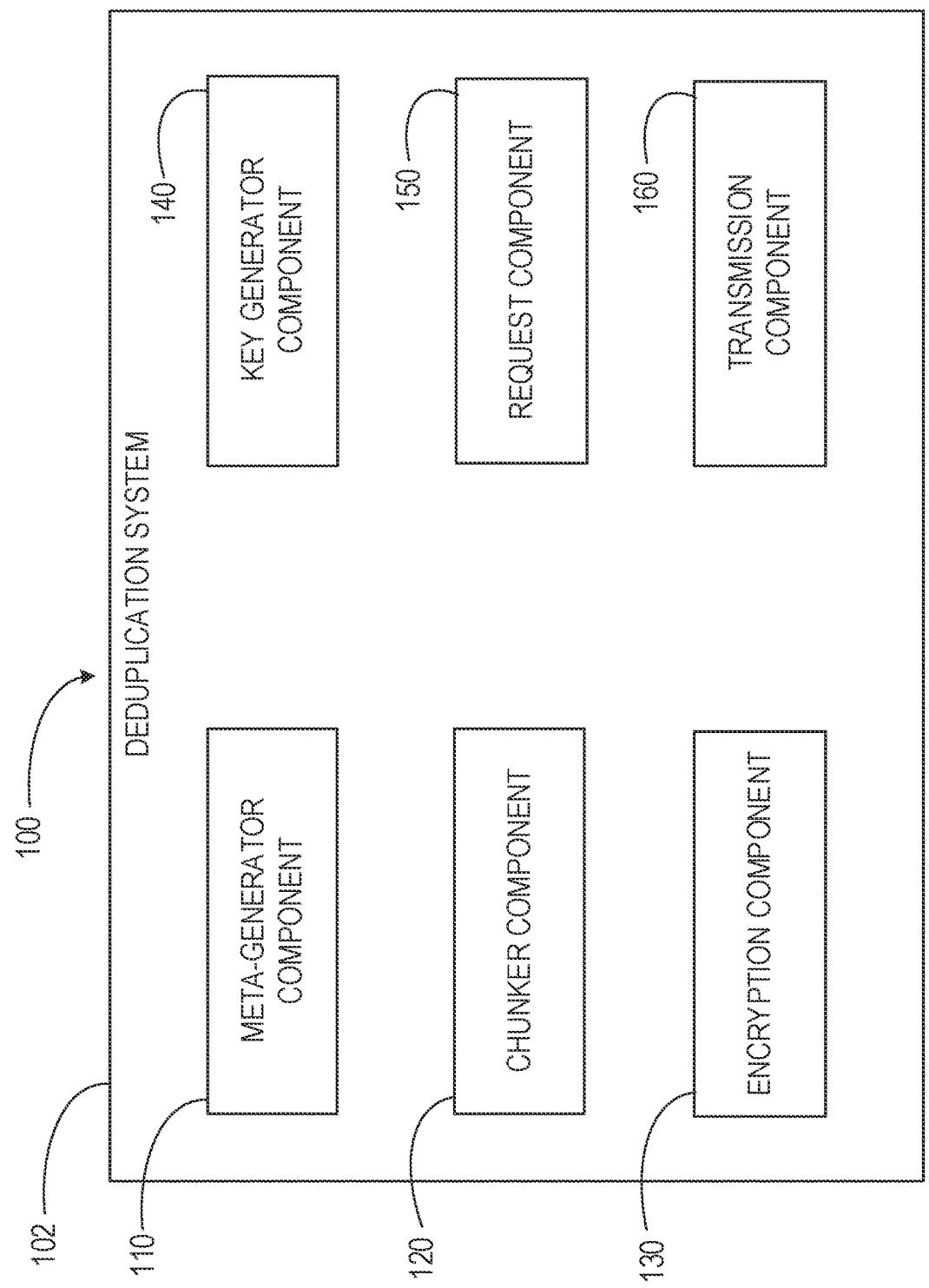
FIG. 1 depicts a block diagram of a computing environment for implementing concepts and computer-based methods, according to at least one embodiment.

The present disclosure relates generally to methods for encrypted data deduplication. More particularly, but not exclusively, embodiments of the present disclosure relate to a computer-implemented method for implementing key in lockbox encrypted data deduplication and transmission. The present disclosure relates further to a related system for encrypted data deduplication, and a computer program product for operating such a system.

Embodiments of the present disclosure maintain network efficiency in communications with key in lockbox encrypted data deduplication and transmission processes. The lockbox in the present disclosure may be understood as an encrypted key. Some embodiments of the present disclosure avoid information exchange and decrease write latency by encrypting data chunks with individual keys and storing encrypted copies of the keys as part of chunk metadata associated with the encrypted data chunks. The encrypted data chunks may be selectively transmitted to a storage system based on information previously stored on the storage system, deduplication operations being performed by the storage system, and network characteristics. Embodiments of the present disclosure enable use of multiple data secret keys, deduplication secret keys, and signature or fingerprint keys. Some of these keys are maintained at a host, without being transmitted to a storage system storing encrypted data chunks sent from the host. Thus, in some embodiments of the present disclosure, the storage system may not access keys used to encrypt data chunks or fingerprints associated with the data chunks.

Embodiments of the present disclosure enable encrypting of data chunks with individual chunk keys. The chunk keys may be generated for individual data chunks or generated for a range of storage space in which one or more data chunks may be stored. The chunk keys may be encrypted with data secret keys and deduplication secret keys. Embodiments of the present disclosure transmit encrypted data chunks, associated chunk metadata, and encrypted chunk keys to data storage systems. The storage system may select to store one of the encrypted chunk keys based on a deduplication status of the chunk. Such embodiments may decrease write latency and simplify communications between the host and storage system in key in lockbox encrypted data deduplication and transmission processes.

Some embodiments of the present disclosure use symmetric key encryption for data. Some embodiments of the present disclosure apply asymmetric encryption as well. Secret keys, discussed in the present disclosure, refer to a key which is not shared between a client or host and a storage system with which the client or host is communicating.

Some embodiments of the present disclosure enables separate data access privileges for users of a given host or client using the key in lockbox encrypted data deduplication and transmission processes. Such embodiments enable each user to have data secret keys for encrypting data. Hosts may enable data deduplication across some subsets of users having separate data access privileges and separate data secret keys. Subsets of users having data deduplication allowed may be understood as key groups. For example, a host may have a set of secret keys, with a first subset forming a first key group, and a second subset forming a second key group. Access control may be provided by a host restricting access to users that are members of the first key group and restricting access of a user to a specific key in the first key group.

In some embodiments, the present disclosure enables deduplication across sets of keys within a key group. Deduplication may be enabled by providing a deduplication secret key for each key group. Embodiments of the present disclosure may use deduplication secret keys to encrypt secret chunk keys. In some embodiments, a fingerprint secret key is provided for each key group. The fingerprint key may be used to encrypt the deduplication metadata prior to transmission to a storage system. The fingerprint key may not be available to users. Access to the deduplication secret key and fingerprint secret key may be shared among key users of an associated key group. In some embodiments, a key identification associated with each data chunk may be used to ensure that only data with a matching key identification, including deduplication data, is returned in response to a read request.

Embodiments of the present disclosure provide range key usage for encryption to separate data chunks and usage of fingerprint keys to prevent cross-tenant deduplication. Fingerprint keys thus enable cryptographic isolation between tenants. Embodiments of the present disclosure preclude information leaking about deduplication.

Some embodiments of the concepts described herein may take the form of a system or a computer program product. For example, a computer program product may store program instructions that, when executed by one or more processors of a computing system, cause the computing system to perform operations described above with respect to the computer-implemented method. By way of further example, the system may comprise components, such as processors and computer-readable storage media. The computer-readable storage media may interact with other components of the system to cause the system to execute program instructions comprising operations of the computer-implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may include an encrypted deduplication system 102. The encrypted deduplication system 102 may comprise a meta-generator component 110, a chunker component 120, an encryption component 130, a key generator component 140, a request component 150, and a transmission component 160. The meta-generator component 110 collects a set of deduplication information on deduplication opportunities. The chunker component 120 identifies and generates data chunks and fingerprints for the data chunks. The encryption component 130 encrypts data chunks, encryption keys, and transmissions by the host. The key generator component 140 generates encryption keys for use by one or more of a host and a storage system. The request component 150 generates read requests for transmission to a storage system. The transmission component 160 transmits encrypted data chunks, encrypted keys, requests, and other suitable information from a host to a storage system. Although described with distinct components, it should be understood that, in at least some embodiments, components may be combined or divided, and/or additional components may be added without departing from the scope of the present disclosure.

Figure 2:
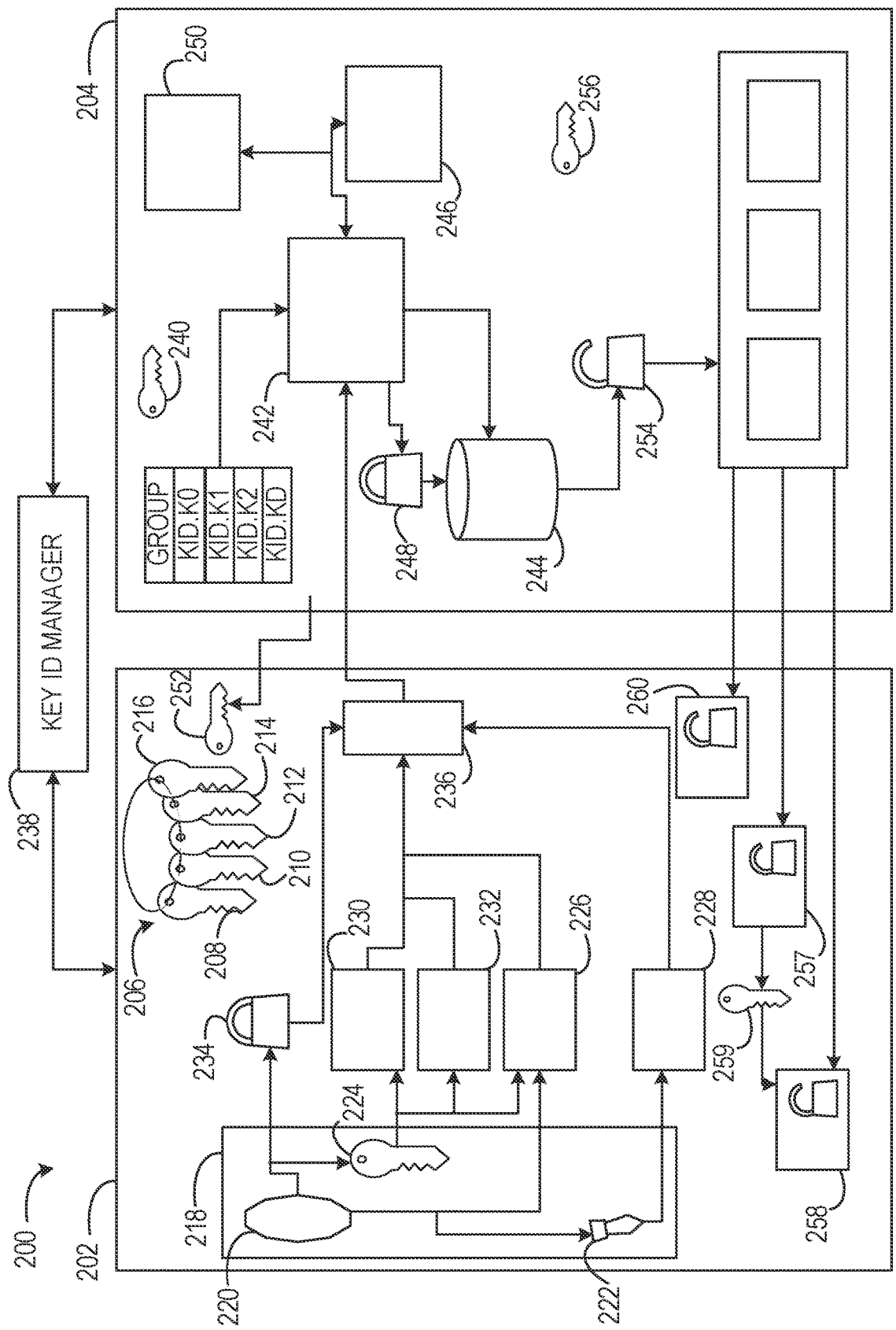
FIG. 2 depicts a block diagram of an architecture for key in lockbox encrypted data deduplication and transmission, according to at least one embodiment.

Referring now to FIG. 2, a block diagram of an example architecture for key in lockbox encrypted data deduplication and transmission is shown. An architecture 200 enables writing data to a storage system and reading data from the storage system according to various embodiments of the present disclosure. As shown in FIG. 2, the architecture 200 includes a host 202 and a storage system 204. Portions of the architecture 200 may be understood as write architecture, including portions of the host 202 and the storage system 204 configured to perform operations relating to write requests and write operations.

The host 202 includes a key group 206. The key group 206 includes a set of data secret keys k0-k2. The data secret keys may include data secret key k0 208, data secret key k1 210, and data secret key k2 212. The key group 206 may include fingerprint key kf 214 and deduplication secret key kd 216.

In some embodiments, the key group 206 may include a data range key and a fingerprint key. Such embodiments may be understood as key per range embodiments. The data range key may be a set of range keys. Each range key may be generated for data chunks within a range. The range may be understood as a consecutive set of logical block addresses. The range or set of logical block addresses may have a common encryption key on the host. In some instances, each range of addresses may have a unique range key associated therewith.

In some embodiments, the host 202 includes meta-generator 218. The meta-generator 218 may be or include meta-generator component 110. The meta-generator 218 is depicted as including chunker module 220, fingerprint generator 222, and secret chunk key generator 224. The chunker module 220 may be all or a portion of chunker component 120. The fingerprint generator 222 may generate fingerprints for data chunks generated by the chunker module 220. The secret chunk key generator 224 may be a portion of key generator component 140, generating keys for encryption of data chunks. In some embodiments, the secret chunk key generator 224 generates chunk keys for unique data chunks. In some embodiments, the secret chunk key generator 224 generates range keys for one or more data chunks occurring within a range of storage addresses or set of consecutive logical block addresses.

In key per range embodiments, a container or logical block address may send data to the chunker module 220. The chunker module 220 may split the data received from the container into data chunks of fixed blocks. For example, the chunker module 220 may split the data into data chunks of 4 kB.

In some embodiments, the host 202 includes a chunk encrypter 226. The host 202 may include a fingerprint encrypter 228. The host 202 may also include a data secret key encrypter 230, a deduplication secret key encrypter 232, and an ephemeral key encrypter 234. The chunk encrypter 226, the fingerprint encrypter 228, the data secret key encrypter 230, the deduplication secret key encrypter 232, and the ephemeral key encrypter 234 may comprise at least a portion of the encryption component 130. The chunk encrypter 226 may encrypt data chunks generated by the chunker module 220. The fingerprint encrypter 228 may encrypt fingerprints of data chunks. In some embodiments, the fingerprint encrypter 228 encrypts fingerprints with a fingerprint key.

The host 202 may also include a data packer 236. The data packer 236 assembles information to be transmitted to the storage system 204. The data packer 236 may assemble deduplication information, encrypted data chunks, encrypted keys, and other suitable information into packets for transmission to the storage system 204. In some embodiments, the data packer 236 comprises at least a portion of the transmission component 160.

In some embodiments, the architecture 200 includes a key identification manager 238. The key identification manager may be at least a portion of a key manager. The key identification manager 238 may be communicatively coupled to one or more of the host 202 and the storage system 204.

The storage system 204 may store data transmitted from the host 202. The storage system 204 may perform deduplication operations associated with management of data within the storage system 204, write requests from the host 202, and read requests from the host 202. The storage system 204 includes a storage secret encryption key 240. The storage secret encryption key 240 may be maintained at the storage system 204. In such embodiments, the storage secret encryption key 240 is not shared with the host 202, other clients or hosts, other storage systems, or intermediate components or systems positioned communicatively between one or more of the storage system 204, the host 202, and other computing systems or devices. The storage secret encryption key 240 may be a symmetric key, an asymmetric key, or any other suitable encryption key. The storage secret encryption key 240 may be generated by or within the storage system 204 by a key generator component forming a part of the storage system 204.

In some embodiments, the storage system 204 includes a deduplication manager 242. The deduplication manager 242 may locate or identify duplicate data on the storage system 204. The duplicate data may be identified or located based on deduplication information or deduplication opportunities received from the host 202. In some embodiments, for chunking deduplication, the deduplication information is used with chunk metadata. The deduplication information and chunk metadata may identify data chunks which are duplicates. The duplicate chunks may be identified based on a write request received from the host 202, such that duplicate chunks may be precluded from transmission to the storage system 204. In some embodiments, the deduplication manager 242 performs deduplication operations associated with identifying duplicate data or duplicate chunks.

In some embodiments, the storage system 204 includes chunk storage 244. The chunk storage 244 may be a data storage device, a data storage component, or data storage structure. The chunk storage 244 may store data chunks, deduplicated data, non-deduplicated data, encrypted data, unencrypted data, deduplication information, combinations thereof, and any other suitable information. The chunk storage 244 may store the data in any suitable manner.

The storage system 204 may include chunk metadata 246. The chunk metadata 246 may include any metadata associated with non-duplicated data chunks, deduplicated data chunks, or combinations thereof. In some embodiments, the non-duplicated data chunks or deduplicated data chunks include pointers, chunk lengths, chunk signatures, chunk locations, combinations thereof, or any other data describing or defining the data chunks.

The storage system 204 may include a storage secret key encrypter 248. The storage secret key encrypter 248 may encrypt data within the storage system 204 with the storage secret encryption key 240. The storage secret key encrypter 248 may encrypt the data on the storage system 204, using the storage secret encryption key 240 in any suitable fashion.

In some embodiments, the storage system 204 includes a temporary log 250. The temporary log 250 may facilitate deduplication operations in a background as other operations are being performed.

In some embodiments, the host 202 key group 206 are not shared with the storage system 204. In such embodiments, the storage secret encryption key 240 is not shared with any host communicating or using the storage system 204. In embodiments with a key manager and key identification manager 238, the host 202 and the storage system 204 may use the key manager or other means to store and manage keys. Encryption and communication between the host 202 and the key manager or between the storage system 204 and the key manager may be performed in any suitable and relevant manner.

The architecture 200 may facilitate key in lockbox encrypted data deduplication and transmission between the host 202 and the storage system 204. In some embodiments, the host 202 issues a request to the storage system 204 prior to writing or reading data at the storage system 204. The request from the host 202 may request an ephemeral key from the storage system 204. In some instances, the host 202 sends key group 206 information with the request. The key group 206 information informs the storage system 204 of the set of keys used by the host 202. In some embodiments, the key group 206 information uniquely identifies each key of the key group 206. The key group 206 information may include a host identifier, a group identifier, and a tag to indicate if the group allows deduplication against clear text (e.g., unencrypted chunks). The key group 206 information may also include a list of key identifiers in the key group 206 and the associated key type identifier. The key type identifier may indicate a data secret key type or a deduplication secret key type. The key group 206 information does not include encryption keys associated with the key identifiers.

In some embodiments, the key identifiers are not determinable from the key itself while the key identifiers are unique. In some instances, the key identifiers may use a value encrypted in a separate key or other mechanism to maintain unique nature of each key identifier. Embodiments of the present disclosure prevent unauthorized entities to gain access to the storage. Although malware may gain access to a process authorized for a given host key identifier, the malware is prevented from deducing other key identifier values. In some embodiments, key identifiers are obtained from the key identification manager 238. The key identification manager 238 may communicate the key identifiers to the storage system 204. The key identification manager 238 may be implemented as software, hardware, or a combination thereof. The key identification manager 238 may be implemented as a standalone entity or a process on the host 202.

In response to the request, the storage system 204 verifies the identity and access permissions associated with the host 202 and the request. In some embodiments, in response to verifying the identity and access permissions, the storage system 204 returns an ephemeral key 252. The ephemeral key 252 may be returned when encryption of metadata is suitable or supported. For example, the ephemeral key 252 may be returned when transport encryption is not used. Subsequent data access requests may include a key identifier associated with a data secret key of the host 202 that will be used to encrypt data being transmitted to the storage system 204. The key identifier may be included in a key identifier message, established for a session, or included in a specified process.

Portions of the architecture 200 may also be understood as a read architecture, including portions of the host 202 and the storage system 204 configured to perform operations relating to read requests and operations to supply data responding to read requests. In some embodiments, the host 202 issues a read request to the storage system 204. The deduplication manager 242 determines data chunks responsive to the read request using deduplication metadata or deduplication information.

The deduplication manager 242 may retrieve data chunks responsive to the request by passing one or more read requests to the chunk storage 244. The data chunks may be retrieved based on deduplication metadata or deduplication information within the request. The chunk storage 244 may pass the data chunks to a storage secret key decrypter 254. The storage secret key decrypter 254 may perform one or more decryption operations using a storage secret key 256. The chunk storage 244 may then pass a set of data and metadata to the host 202. In some instances, the data or metadata includes an encrypted chunk fingerprint, an encrypted chunk key, an encrypted data chunk, and additional relevant metadata.

The host 202 may receive the encrypted chunk key, the encrypted chunk fingerprint, the encrypted data chunk, and the metadata. Upon receiving the information, a chunk decrypter 258 determines a key identifier associated with the data chunk to determine which chunk key is used to decrypt the data chunk. For example, the data secret key kn may be a suitable decrypting key on the host 202. The chunk key may be decrypted at 257 to produce the chunk secret key 259. The chunk secret key 259 and the encrypted data chunk may be passed to the chunk decrypter 258. The chunk decrypter 258 may decrypt the data chunk using the decrypted chunk secret key 259 to produce a clear text version of the data chunk. The encrypted fingerprint may be passed to a fingerprint decrypter 260 within the host 202. The fingerprint decrypter 260 may use the fingerprint secret key to decrypt the fingerprint of the data chunk to produce a clear text fingerprint. The clear text data chunk is passed to the fingerprint generator 222 to compute a second fingerprint of the data chunk. The original fingerprint and the second fingerprint may be compared. Once the original fingerprint and the second fingerprint are determined to be equal, the decrypted data chunk is determined to be correct or verified. The components of the host 202 may repeat the operations for each data chunk within a response to a read request until no more data chunks remain encrypted in the response. Each data chunk is decrypted with a key indicated for that data chunk. In some embodiments, the deduplication secret key is used for decrypting deduplicated data chunks.

In key per range embodiments, the host 202 may issue a read request and receive from the storage system 204 data chunks read from the chunk storage 244. Data chunks are decrypted by the storage system 204 using the storage key. Data chunks and fingerprints are then returned to the host 202. Stored fingerprints are decrypted with a secret key (e.g., the fingerprint key hf) at the host 202. Data chunks are then decrypted at the host 202 using the data range key hr. A new fingerprint is computed for the data chunk returned in the response to the read request. The new fingerprint and the original fingerprint are compared to validate the data chunk returned in the response to the read request. Unencrypted chunks may then be merged, if the fingerprint was valid. The merged data may then be presented to the host 202.

Figure 3:
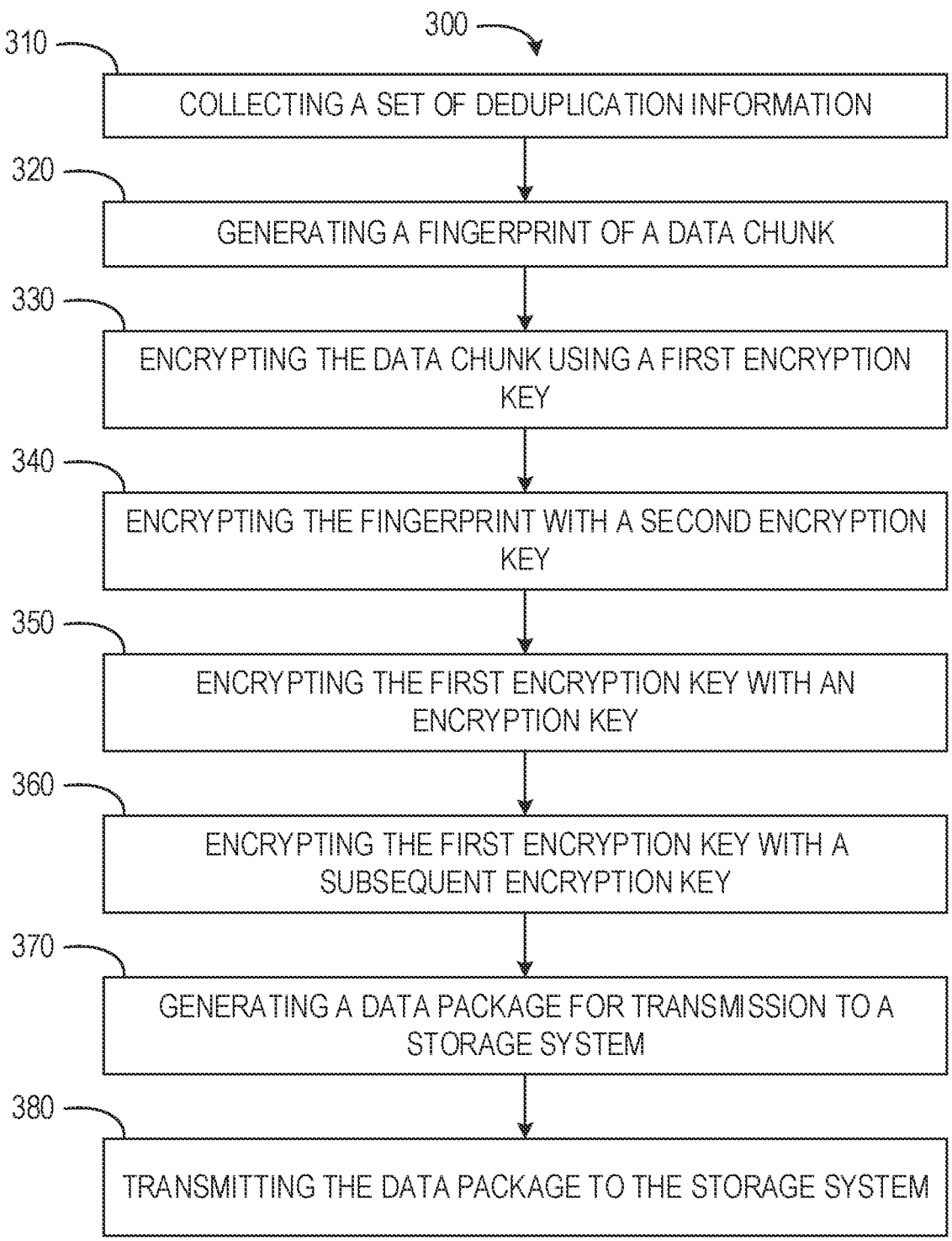
FIG. 3 depicts a flow diagram of a computer-implemented method for implementing key in lockbox encrypted data deduplication and transmission, according to at least one embodiment.

Referring now to FIG. 3, a flow diagram of a computer-implemented method 300 is shown. The computer-implemented method 300 is a method for implementing key in lockbox encrypted data deduplication and transmission. In some embodiments, the computer-implemented method 300 may be performed by one or more components of the computing environment 100, as described in more detail below.

At operation 310, the meta-generator component 110 collects a set of deduplication information. The deduplication information may be collected by the meta-generator 110 as part of the host 202 in communication with the storage system 204. The host may communicate with the storage system via a communications network. The set of deduplication information may include chunk fingerprints, deduplication hashes, chunk start positions, chunk lengths, and any other suitable and relevant information. The chunk start positions may indicate a starting position or location, within a memory device, at which a first portion of a data chunk is stored. The deduplication hashes may include rolling minimum hashes.

In some embodiments, the meta-generator component 110 uses a sliding window variable chunk deduplication technique to identify the set of deduplication information. The set of deduplication information may be understood to represent data deduplication opportunities. In sliding window variable cases, deduplication information may include a starting offset and a length. For fixed block deduplication, deduplication information may include fingerprint data for a data chunk. In some instances, the meta-generator component 110 or the meta-generator 218 performs deduplication related functions associated with identifying deduplication opportunities or deduplication information. The meta-generator component 110 may also compress data to be transmitted to the storage system 204. In some embodiments, the deduplication operations depend on a type of deduplication being performed. The sliding window variable chunk deduplication may enable the meta-generator component 110 or the chunker module 220 to identify data chunk locations and lengths of the data chunks. The chunker module 220 may pass the deduplication information to an ephemeral encrypter. The chunker module 220 may also pass other chunk metadata for the data chunk to the ephemeral encrypter.

In some embodiments, the chunker component 120 identifies data chunks. The data chunks may be associated with the set of deduplication information. The data chunks identified by the chunker component 120 may be part of a set of data chunks. At least a portion of the set of data chunks may be identified for storage on the storage system. In some embodiments, the data chunks to be stored on the storage system may be write data chunks. The write data chunks may be subject to a write command or request. The chunker component 120 may identify chunk locations and lengths associated with the set of data chunks. The chunker component 120 may pass information representing the chunks (e.g., the set of data chunks and chunk metadata) to the encryption component 130.

In some embodiments, the chunker component 120 signals the key generator component 140 for each data chunk of the set of data chunks. The chunker component 120 may signal the key generator component 140 (e.g., the secret chunk key generator 224) to generate a new encryption key for each data chunk of the set of data chunks. The key generator component 140 add a new encryption key for each data chunk to the key group 206. In some embodiments, each new encryption key is a chunk key or data secret key.

By way of example, in operation 310, the host 202 may write data M0 to be stored at location L0 in the storage system 204. The chunker module 220 creates a list of chunks, such as chunk [ ]. The chunks may include associated data and metadata. Each chunk in chunk [ ] may be processed and prepared for encryption and transmission. Once the chunks have been created, the secret chunk key generator 224 generates a new secret key f[i] for chunk i.

At operation 320, the chunker component 120 generates a fingerprint of a data chunk to be stored on the storage system. In embodiments where the chunker component 120 identifies a set of data chunks, the chunker component 120 may generate a set of fingerprints for the set of data chunks. Each fingerprint of the set of fingerprints is associated with or corresponds to a data chunk of the set of data chunks. In the example of the list, chunk [ ], the chunker component 120 using fingerprint generator 222 computes a fingerprint, S[i], for each chunk. For example, the fingerprint S[i] may be generated for chunk[i].d.

The chunker module 220 may pass data chunks of the set of data chunks to the fingerprint generator 222. The fingerprint generator 222 may create or generate a chunk fingerprint for each data chunk of the set of data chunks. The fingerprint of each data chunk may be a signature, such as a cryptographic hash of the data chunk. The fingerprint, for each data chunk, may be transmitted to the encryption component 130 after the fingerprint is generated.

At operation 330, the encryption component 130 encrypts the data chunk using a first encryption key. In some embodiments, the encryption component 130 generates an encrypted data chunk. In some embodiments, the first encryption key is a chunk key. The chunk key may be generated for a specified or unique data chunk of the set of data chunks. The first encryption key may also be a secret key or data secret key generated for the data chunk. The first encryption key may be one of a plurality of encryption keys generated by the key generator component 140 and included among the key group 206.

In some embodiments the chunker module 220 passes data chunks to the chunk encrypter 226 within the encryption component 130. The chunk encrypter 226 encrypts the data chunk with an encryption key associated with the data chunk. For example, the first encryption key used to encrypt the data chunk may be a chunk key generated for that data chunk. In some instances, the chunk encrypter 226 compresses each data chunk received from the chunker module 220 prior to encryption. By way of further example, for data chunk[i].d for chunk i, the encryption component 130 may compress the data chunk and encrypt the data chunk with chunk secret key f[i]. The encrypted data chunk may then be packed into pack[i].d. In some embodiments, a location and other metadata information for chunk[i].L for chunk i is encrypted with an ephemeral key and packed into pack[i].L.

In embodiments where the chunker component 120 identifies the set of data chunks, the key generator component 140 generates a set of unique data chunk keys. Each unique key is associated with a data chunk of the set of data chunks. Once the set of unique chunk keys are generated, the encryption component 130 encrypts each data chunk of the set of data chunks with the unique data chunk key associated with that data chunk. Encryption of each data chunk with a corresponding unique data chunk key generates a set of encrypted data chunks.

At operation 340, the encryption component 130 encrypts the fingerprint with a second encryption key. The encryption component 130 may generate an encrypted fingerprint. In some embodiments, the second encryption key is a fingerprint key. For example, the encryption component 130 may use fingerprint encrypter 228 to encrypt the signature S[i] for data chunk[i].d. In embodiments where the chunker component 120 identifies a set of data chunks and a set of fingerprints corresponding to the set of data chunks, the encryption component 130 encrypts the set of fingerprints with the second encryption key to generate a set of encrypted fingerprints. In some embodiments, the second encryption key may be a same encryption key for each fingerprint of the set of fingerprints. In some embodiments, the second encryption key may be understood as a set of second encryption keys. Each second encryption key of the set of second encryption keys may be used to encrypt a fingerprint of the set of fingerprints. In such embodiments, each unique fingerprint may be encrypted with a unique second encryption key to generate a unique encrypted fingerprint. The encrypting a set of fingerprints with a set of fingerprint keys may limit a scope of the deduplication domain.

The second encryption key may be one of a plurality of encryption keys generated by the key generator component 140. In some embodiments, the second encryption key is a fingerprint key. Fingerprint keys may prevent cross-tenant deduplications. The fingerprint key may be generated for the fingerprint associated with a specified data chunk of the set of data chunks. In some embodiments, the second encryption key is maintained at the host without being transmitted to the storage system.

Once generated by the fingerprint generator 222, the fingerprint generator 222 may pass each fingerprint to the fingerprint encrypter 228 within the encryption component 130. The fingerprint encrypter 228 may encrypt the fingerprint using a fingerprint secret key, such as fingerprint key 214. In such embodiments, deduplication may be precluded outside of a key group. In some instances, the fingerprint encryption is skipped.

In embodiments where a set of data chunks are generated in operation 310, the components of the deduplication system 102 repeats steps described in operations 310 to 340 as long as there are additional data chunks to process in chunk[ ]. When no more chunks remain to be processed, the data packer 236 packs information into pack[ ]. Pack[ ] is then sent to the storage system 204.

At operation 350, the encryption component 130 encrypts the first encryption key with an encryption key. The encryption key used to encrypt the first key may be a subsequent encryption key or a second encryption key, such as a data secret key. Using the third encryption key, the encryption component 130 may generate a first encrypted key. In some embodiments, the third encryption key is a data secret key. For the example of chunk i and secret key f[i] for chunk i, the data secret key encrypter 230 may encrypt the secret key f[i] using a data secret key of the key group 206. The encrypted secret key f[i] may then be packed into pack[i].f_kn. In embodiments where the data chunk is a part of a set of data chunks and the secret chunk key generator 224 generates a chunk secret key for each data chunk of the set of data chunks, the secret chunk key generator 224 may pass the chunk secret key to the data secret key encrypter 230. The data secret key encrypter 230 may encrypt each chunk secret key with a data secret key associated with the data chunk or a data secret key associated with the key group 206. The data secret key encrypter 230 sends encrypted chunk keys to the data packer 236.

At operation 360, the encryption component 130 encrypts the first encryption key with an encryption key. In some instances, the encryption key used to encrypt the first encryption key is a subsequent encryption key or a third encryption key, such as a deduplication secret key. In some instances, the encryption key is a fourth encryption key. Using the fourth encryption key, the encryption component 130 may generate a second encrypted key. In some embodiments, the fourth encryption key is a deduplication secret key. For the example of chunk i and secret key f[i] for chunk i, the deduplication secret key encrypter 232 may encrypt the secret key f[i] using the deduplication secret key. The encrypted secret key f[i] may then be packed into pack[i].f_kd. In some embodiments, where the data chunk is a part of a set of data chunks and the secret chunk key generator 224 generates a chunk secret key for each data chunk of the set of data chunks, the secret chunk key generator 224 passes each chunk secret key to the deduplication secret key encrypter 232. The deduplication secret key encrypter 232 encrypts the chunk secret key with a deduplication secret key associated with the data chunk or a deduplication secret key associated with the key group 206. The deduplication secret key encrypter 232 sends the encrypted chunk key to the data packer 236 for packing and subsequent transmission.

In some embodiments, the second encryption key, the third encryption key, and the fourth encryption key are maintained at the host 202. The second encryption key, the third encryption key, and the fourth encryption key may be maintained at the host without being transmitted to the storage system 204.

At operation 370, the transmission component 160 generates a data package for transmission to the storage system. The data package may include at least one of the deduplication information, the encrypted data chunk, the encrypted fingerprint, the first encrypted key, and the second encrypted key. The transmission component 160 may determine components or elements to include within the data package dynamically. In some instances, the transmission component 160 determines the elements to include in the data package based on a network characteristic of the communications network between the host 202 and the storage system 204 or a deduplication characteristic of the storage system 204.

In some instances, the transmission component 160 may dynamically select between a full data package or a limited data package. Selection between the full or limited data package may be performed based on network characteristics, deduplication characteristics, or any other suitable characteristics of one or more of the host 202, the storage system 204, or the communications network extending therebetween.

In embodiments where the chunker component 120 identifies the set of data chunks and generates the set of fingerprints, the transmission component 160 may transmit the data package including the deduplication information, the set of encrypted data chunks, and the set of encrypted fingerprints to the storage system 204. In some instances, the chunker module 220, and various components therein, passes encrypted data chunks, encrypted fingerprints, and other information to the data packer 236. For example, the chunker module 220 may send encrypted data chunks, encrypted fingerprints, and encrypted metadata to the data packer 236. The data packer 236 assembles the deduplication information for encrypted data chunks and other elements into the data package and transmits the packed information to the storage system 204.

At operation 380, transmission component 160 transmits the data package to the storage system. The data package may include the deduplication information and the encrypted fingerprint. In some instances, the data package includes the deduplication information, the encrypted data chunk, and the encrypted fingerprint. The data package may also include at least one of the first encrypted key and the second encrypted key. In some embodiments, the data packer 236 transmits the packed information or data package to one or more intermediate systems, components, or devices to direct the packed information to the storage system 204.

Figure 4:
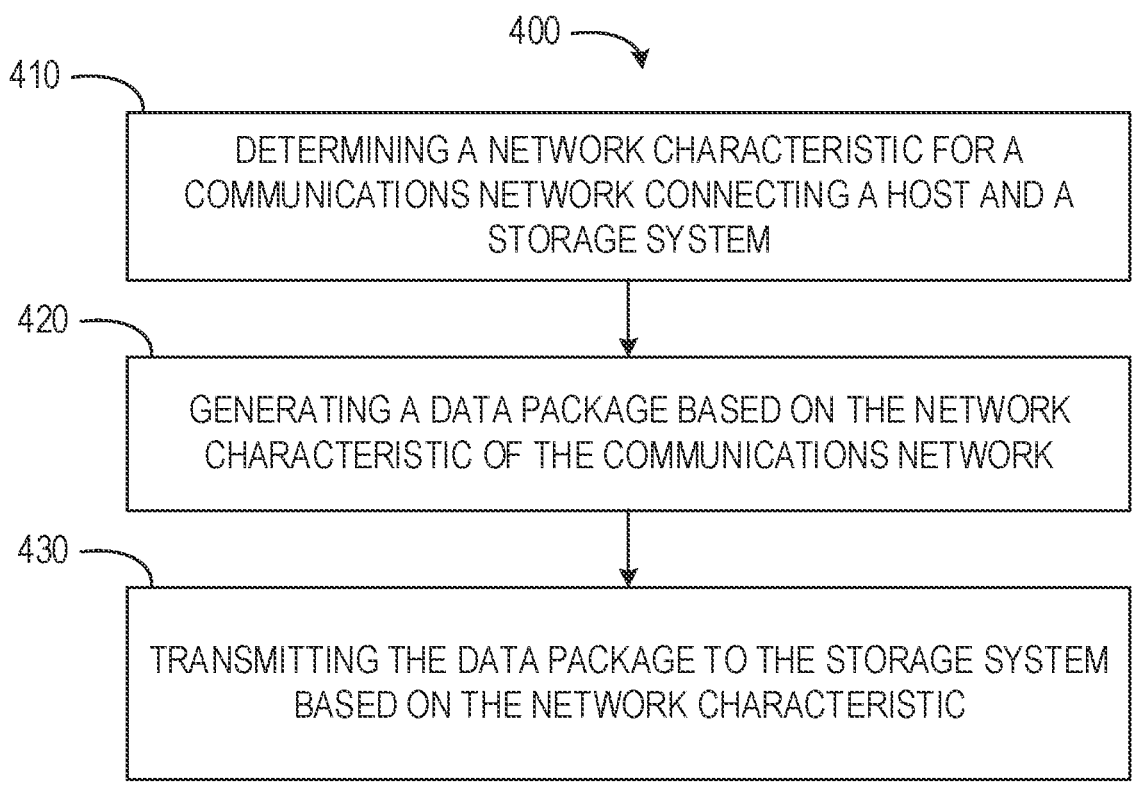
FIG. 4 depicts a flow diagram of a computer-implemented method for implementing key in lockbox encrypted data deduplication and transmission, according to at least one embodiment.

FIG. 4 shows a flow diagram of an embodiment of a computer-implemented method 400 for implementing key in lockbox encrypted data deduplication and transmission. The method 400 may be performed by or within the computing environment 100. In some embodiments, the method 400 comprises or incorporates one or more operations of the method 300. In some instances, operations of the method 400 may be incorporated as part of or sub-operations of the method 300.

At operation 410, the transmission component 160 determines a network characteristic for a communications network connecting the host 202 and the storage system 204. In some embodiments, the network characteristic is a bandwidth of the communications network. The network characteristic may also be a deduplication characteristic. Where the network characteristic is a network bandwidth, the bandwidth may be evaluated based on a bandwidth threshold indicating a specified or dynamically determined bandwidth for the communications network. The transmission component 160 may determine the bandwidth is below a bandwidth threshold for a deduplication request. Where the bandwidth is below the bandwidth threshold, the transmission component 160 may select a limited number of elements for inclusion in the data package.

In some embodiments, the bandwidth is determined to be above the bandwidth threshold. In such instances, the transmission component 160 may generate the data package to include the deduplication information, the encrypted data chunk, the encrypted fingerprint, the first encrypted key, and the second encrypted key are provided in the data package. In some embodiments, the bandwidth is determined to be below the bandwidth threshold and the transmission component 160 may select the encrypted fingerprint for inclusion in the data package.

In some embodiments, the network characteristic is a deduplication characteristic. In such instances, the transmission component 160 may generate the data package based on a specified deduplication characteristic of one or more of the host 202 and the storage system 204. A deduplication characteristic of the storage system 204 may specify which elements are to be included in the data package. The deduplication characteristic may be set at the storage system 204, may be dynamically selected based on bandwidth or network connection between the host 202 and the storage system 204, or may be selected at the host 202 and initiated at the storage system 204 based on the data package received from the host 202.

At operation 420, the transmission component 160 generates the data package based on the network characteristic of the communications network. Where the transmission component 160 determines the bandwidth is below the bandwidth threshold, the transmission component 160 may select one or more elements available for inclusion in the data package for transmission to the storage system 204. In some embodiments, the one or more elements include the deduplication information, the encrypted fingerprint, the encrypted data chunk, the first encrypted key, and the second encrypted key. For example, the data package may include the encrypted fingerprint where the bandwidth is below the bandwidth threshold. The encrypted fingerprint may be included in the data package to limit an amount of data transmitted between the host 202 and the storage system 204.

Where the network characteristic is the deduplication characteristic, the deduplication characteristic may specify that all of the elements are to be included in each data package, write request, or each data package initiating a write operation for the storage system 204. The deduplication characteristic may specify that fingerprints or other limited data package is to be sent in write requests. For example, the limited data package may include the encrypted fingerprint. Where the storage system 204 identifies a match for the encrypted fingerprint, the storage system 204 may respond to the data package indicating completion of the write request or requesting additional information to complete the write request. For example, where the encrypted fingerprint is matched in the storage system 204 indicating a specified data chunk is stored with a specified data secret key or a specified deduplication secret key, the storage system 204 may respond to the host 202 with a write complete message. Where one or more of the data chunk with the specified data secret key or the specified deduplication secret key are missing, the storage system 204 may request a subsequent data package including the deduplication information, the encrypted data chunk, the encrypted fingerprint, and either the first encrypted key or the second encrypted key. The first encrypted key or the second encrypted key may be requested depending on which data chunk and key (e.g., data secret key or deduplication secret key) is missing from the storage system 204.

At operation 430, the transmission component 160 transmits the data package to the storage system 204 based on the network characteristic. The transmission component 160 may transmit the data package to the storage system 204 in a manner similar to or the same as described above with respect to operation 380. The transmission component 160 may transmit the data package directly to the storage system 204 or to an intermediary system or network component, which may then transfer the data package to the storage system 204.

Figure 5:
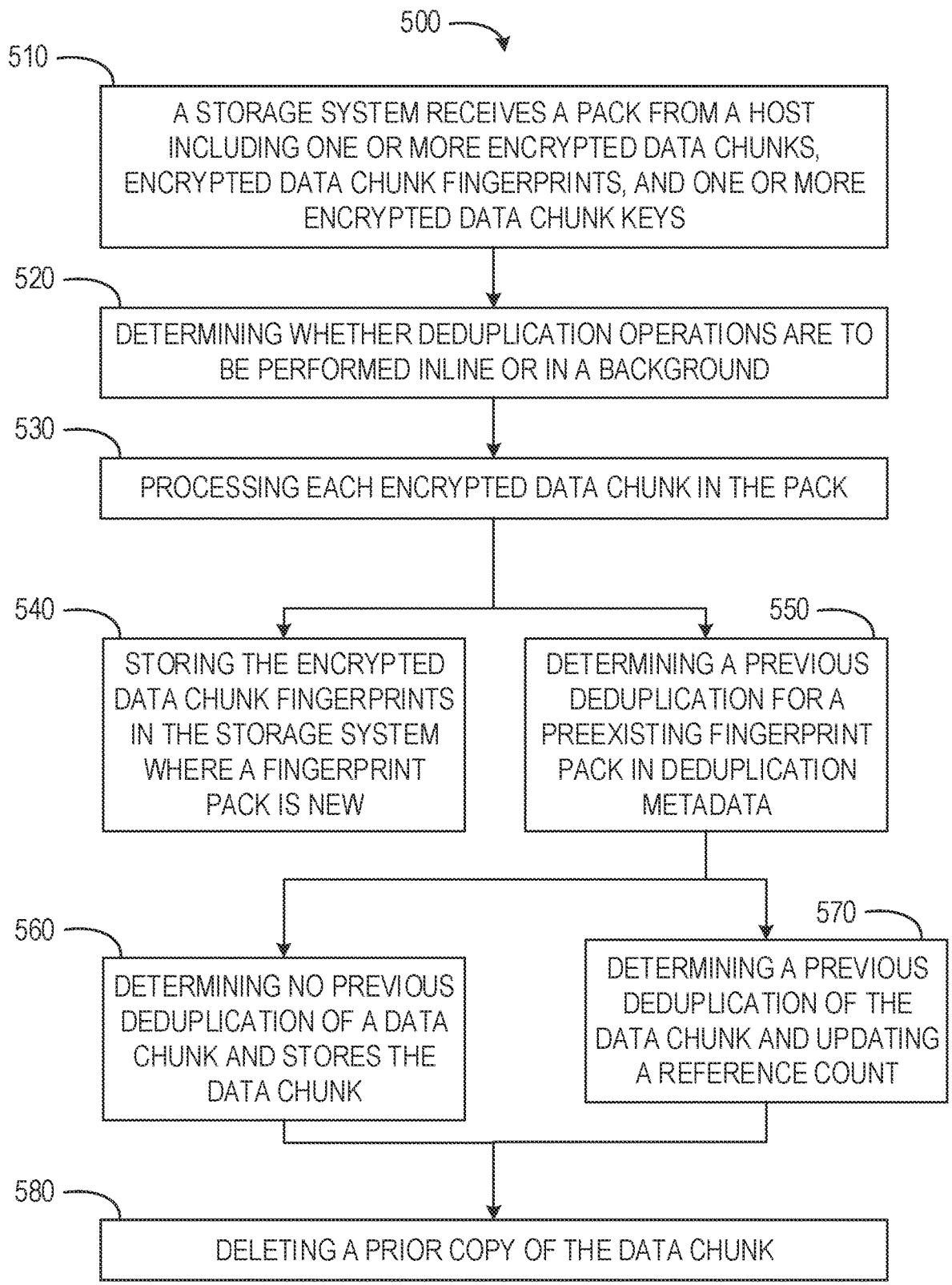
FIG. 5 depicts a flow diagram of a computer-implemented method for implementing key in lockbox encrypted data deduplication and transmission, according to at least one embodiment.

FIG. 5 shows a flow diagram of an embodiment of a computer-implemented method 500 for implementing key in lockbox encrypted data deduplication and transmission. The method 500 may be performed by or within the computing environment 100. In some embodiments, the method 500 comprises or incorporates one or more operations of the methods 300 or 400. In some instances, operations of the method 500 may be incorporated as part of or sub-operations of the methods 300 or 400.

At operation 510, the deduplication manager 242 receives a pack from the host 202. In some instances, the deduplication manager 242 receives metadata from the host 202 along with the data package. The pack may be received from the host 202 via a communications network. Once received, the storage system 204 may store or write the pack information to the temporary log 250.

In some embodiments, once received, the storage system 204 stores the data package and metadata in the temporary log 250. For example, fingerprint S[i] for data chunk[i].d, the packer may store the encrypted fingerprint in a packed list pack[i].s. Upon storing the packed data and metadata, the storage system 204 transmits a write completion response to the host 202. The deduplication manager 242 may also complete deduplication operations based on the received data package and metadata and the request originating transmission of the data package and metadata. In embodiments where the data package is limited, such as including only the encrypted fingerprint, the storage system 204 may perform operations in response to the received data package and transmit data requests to the host 202 for additional information. For example, where the data package includes only the encrypted fingerprint, the storage system 204 may determine a data chunk associated with the encrypted fingerprint is missing and request transmission of the deduplication information, the encrypted data chunk, and at least one of the first encrypted key and the second encrypted key.

In some embodiments, the ephemeral key may be used by the host 202 to encrypt the metadata. The storage system 204 may generate the ephemeral key and share the ephemeral key with the host 202. In such embodiments where the data package is received along with metadata encrypted by the ephemeral key, the storage system 204 may decrypt the metadata encrypted with the ephemeral key. Once the metadata is decrypted, the storage system 204, for each data chunk, may determine if a fingerprint for the data chunk matches a deduplication metadata storage fingerprint and perform deduplication operations. Where a data chunk is stored, the storage system 204 can further encrypt the data with storage secret key encrypter 248 before storing the data chunk in the chunk storage 244.

For the example of pack [ ], once received at the storage system 204, the pack H information is written to a log, such as temporary log 250. The write complete may be returned to the host 202 to complete the write operation sequence for the host 202 for instances where deduplication operations are performed in the background. In some embodiments, where deduplication operations are performed in line, the write complete may be returned to the host 202 after completion of the deduplication operations.

At operation 520, the deduplication manager 242 determines whether the deduplication operations are to be performed in line or in the background. When the deduplication manager 242 determines the deduplication operations are to be performed in the background, the deduplication manager 242 causes the storage system 204 to return a write complete message to the host 202. The write complete message may indicate the pack has been received and written within the temporary log 250. Where the deduplication manager 242 determines the deduplication operations are to be performed in line, the deduplication manager 242 proceeds to operation 530.

At operation 530, the deduplication manager 242 processes each data chunk within the pack, such as pack [ ]. In processing each data chunk, the deduplication manager 242 searches for fingerprint pack data in deduplication metadata or deduplication information. For example, the deduplication manager 242 may search the deduplication metadata for fingerprint pack[i].S for pack chunk i.

At operation 540, where the fingerprint pack is new, or not found within the deduplication metadata or deduplication information, the deduplication manager 242 stores the fingerprint pack along with the chunk key encrypted with the associated data secret key. For example, chunk data pack[i].d may be stored along with the encrypted chunk key in the data secret key pack[i].f_kn. In some embodiments, the encrypted chunk key encrypted with the deduplication secret key, pack[i].f_kd is discarded. Other metadata associated with pack[i] is also stored. The deduplication manager 242 then updates the deduplication metadata or deduplication information. In some embodiments, the deduplication metadata is tagged to indicate that the chunk key is encrypted with a data secret key, and the key identifier associated with the data secret key is stored.

The deduplication manager 242 may repeat processing, pack look up, deduplication metadata comparison, and storage for each data chunk within the set of data chunks received by the storage system 204. After processing and storing each new data chunk, the deduplication manager 242 may determine that an additional data chunk exists within the pack and continue another iteration on the newly found data chunk. When the deduplication manager 242 determines that no more data chunks exist in the pack, the deduplication manager 242 may end. Where the deduplication operations are being performed in line, once the deduplication manager 242 ends processing of all of the data chunks within the pack, the deduplication manager 242 returns a write complete message to the host 202.

In embodiments where the data pack is a limited data pack including the encrypted fingerprint, and the deduplication manager 242 determines the fingerprint pack is new, the storage system 204 transmits a chunk request to the host 202. The host 202 may generate a second data package in response to the chunk request. The second data package may be the full data package or a partial data package. In some instances, the second data package includes the deduplication information, the encrypted data chunk, and the first encrypted key. Once the encrypted data chunk is received by the storage system 204 and the deduplication manager 242 the encrypted fingerprint, the encrypted data chunk, and any associated keys received in the data package or the second data package are stored within the storage system 204.

In operation 550, where the fingerprint pack[i].S is found in the deduplication metadata or deduplication information, the deduplication manager 242 determines whether the data chunk i has previously been deduplicated. The deduplication manager 242 may determine prior deduplication by determining whether the fingerprint pack[i].S has been previously stored within the storage system 204. In some embodiments, the deduplication manager 242 determines previous deduplication based on a key used to encrypt the chunk key associated with the data chunk. In such instances, the deduplication manager 242 may determine the chunk i was not previously deduplicated by determining the chunk key associated with the data chunk is encrypted with a data secret key. The deduplication manager 242 may determine the chunk i was previously deduplicated by determining the chunk key associated with the data chunk is encrypted with the deduplication secret key. In some embodiments, the deduplication manager 242 determines previous deduplication of the data chunk by determining whether the chunk i's encryption key is encrypted with and stored in a data secret key, and the written key is a different data secret key indicating a first deduplication.

In operation 560, where the deduplication manager 242 determines no previous deduplication of the chunk, the deduplication manager 242 stores the data chunk. For example, the deduplication manager 242 may store the data chunk pack[i].d. In such instances, the deduplication manager 242 stores the chunk key, encrypted with the data secret key (e.g., pack[i].f_kn) along with the data chunk. The chunk key encrypted with the deduplication secret key, pack[i].f_kd, is then discarded. In some embodiments, other metadata associated with the pack containing the data chunk is stored as well. Once stored, the deduplication metadata or the deduplication information is updated. The deduplication metadata may be tagged during updating. The tag may indicate that the chunk key is encrypted with the data secret key, and the key identifier associated with the data secret key is stored as the encrypting key identifier. In some embodiments, a reference count associated with the data chunk is updated for the key identifier associated with the data secret key. The reference count may indicate that the key identifier associated with the data secret key wrote the data chunk. Where the key identifier associated with the data secret key is not currently associated with the data chunk, the key identifier entry may be created with a reference count of one. Further, the deduplication metadata may be updated upon generation or incrementing of the reference count.

In some embodiments, the storage system 204 retains the chunk key encrypted with the data secret key and the chunk key encrypted with the deduplication secret key on a first writing of a data chunk.

In operation 570, where the deduplication manager 242 determines a previous deduplication of the data chunk, the deduplication manager 242 updates a reference count associated with the previously deduplicated data chunk. The deduplication manager 242 may update the reference count for the key identifier associated with the data secret key as the key identifier that wrote the data chunk. In some instances, the key identifier associated with the data secret key may not yet be associated with the data chunk. In such instances, the key identifier entry is created with a reference count of one.

In some embodiments, the deduplication manager 242 updates deduplication metadata or deduplication information based on updating the reference count. Data chunks which have been written in a single key may remain encrypted in the associated data secret key. In such instances, the data chunk may have a reference count greater than one while encrypted in the data secret key.

In operation 580, once the deduplication manager 242 performs either of operation 560 or 570, the deduplication manager 242 may delete any prior copy of the data chunk. In some instances, the chunk key encrypted with the data secret key is also deleted. In response to deleting a prior copy of the data chunk or storing a newly obtained data chunk, the deduplication manager 242 may determine whether an additional data chunk exists in the pack. Where another data chunk exists, the deduplication manager 242 may repeat one or more of the operations of the method 500 until all of the deduplications have been performed for data chunks within the pack. When no more data chunks are available in the pack, the deduplication operations may terminate.

In some instances, where a host 202 sends unencrypted data chunks to the storage system 204, the unencrypted data chunk may be tagged as having no associated encryption key from the host 202. The unencrypted data chunk may be tagged in the chunk metadata.

In some embodiments, deduplication operations are performed at ingest of the pack within the storage system 204. In such instances, the storage system 204 may preclude use of the temporary log 250.

Figure 6:
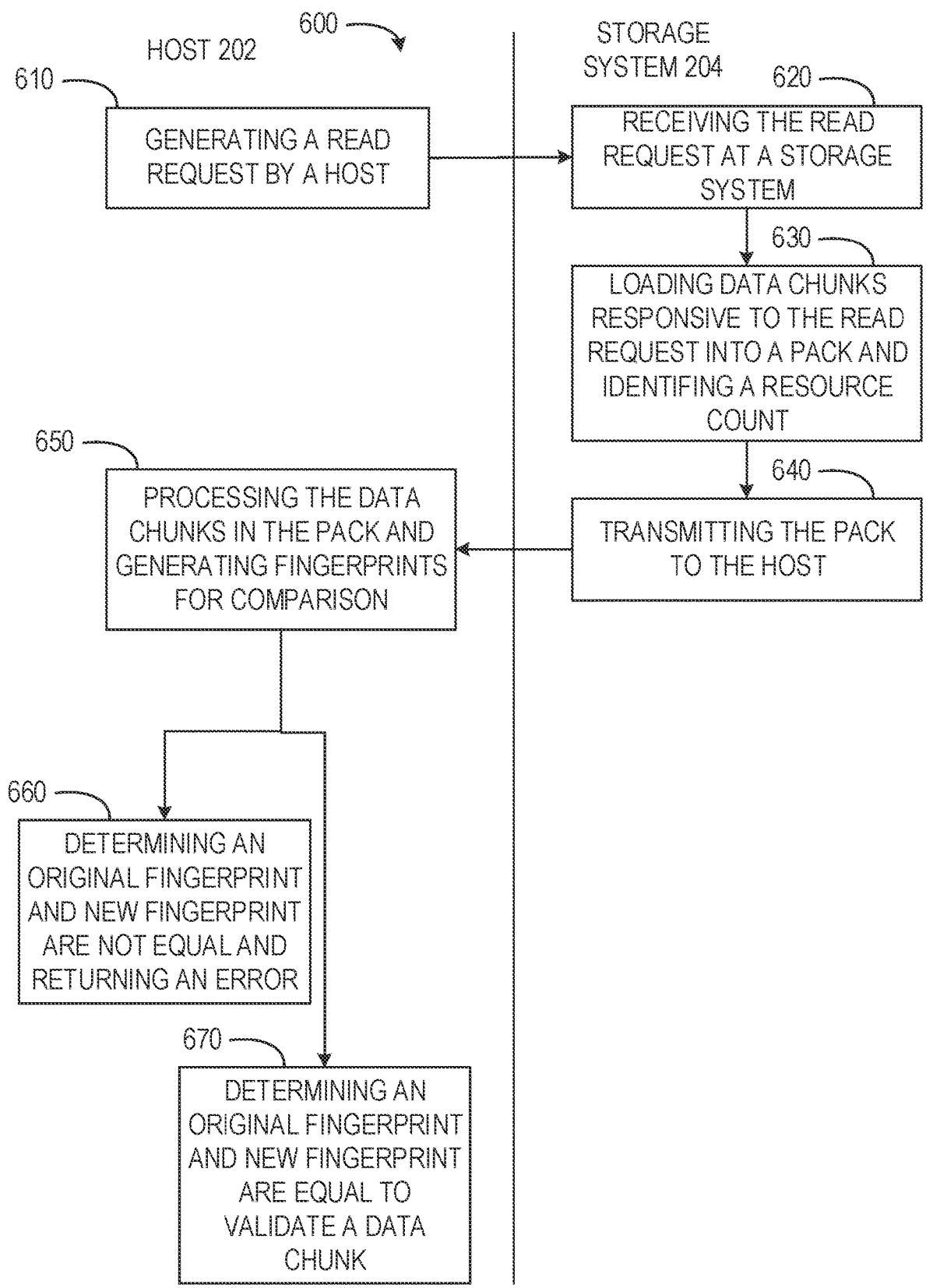
FIG. 6 depicts a flow diagram of a computer-implemented method for implementing key in lockbox encrypted data deduplication and transmission, according to at least one embodiment.

FIG. 6 shows a flow diagram of an embodiment of a computer-implemented method 600 for implementing key in lockbox encrypted data deduplication and transmission. The method 600 may be performed by or within the computing environment 100. In some embodiments, the method 600 comprises or incorporates one or more operations of the methods 300, 400, or 500. In some instances, operations of the method 600 may be incorporated as part of, sub-operations of, or in response to the methods 300, 400, or 500.

At operation 610, the host 202 generates a read request. The read request may be generated for one or more data chunks at one or more specified locations. By way of example, a data chunk is specified in a read request at location L0. The read request may include a key identifier associated with the location. Inclusion of the key identifier may act as a manner or verification of access control. Once generated, the read request is transmitted from the host 202 to the storage system 204.

At operation 620, the storage system 204 receives a read request. The read request may be received from the host 202. The read request may be received from the host 202 via a communications network or one or more intermediate computing devices communicatively positioned between the host 202 and the storage system 204.

At operation 630, the storage system 204 loads each data chunk responsive to the read request. Once identified, the storage system 204 loads each data chunk into a pack. As each chunk is loaded into the pack, the storage system 204 determines whether an additional chunk is responsive to the read request. Once the last chunk is loaded, the pack is prepared.

In some embodiments, for each chunk associated with the location indicated in the read request, the storage system 204 performs a lookup within the chunk storage 244. The storage system 204 then checks a key identifier within the read request against an access list for the data chunk. If the data chunk has a reference count that does not have a non-zero value for the read request key identifier, a key identifier error may be returned to the host 202. Read operations may be halted once a key identifier error is encountered as an access violation. Where the reference count has a non-zero value for a read request key identifier, the storage system 204 loads the data chunk and associated metadata into the pack. The storage system 204 repeats operation 630 for each data chunk associated with the read request, such as the data chunks occurring at location L0

At operation 640, the storage system 204 transmits the pack to the host 202. The pack may be transmitted to the host 202 via a communications network. In some instances, the pack is transmitted to the host 202 via one or more intermediate computing devices.

In operation 650, the host 202 processes each data chunk in the response to the read request. For each data chunk, the host 202 decrypts a fingerprint from the pack, such as fingerprint pack[i].S for chunk i. Each fingerprint may be decrypted using a fingerprint secret key, such as ks. Decrypting each fingerprint generates each clear text fingerprint, such as S[i] for chunk i.

The host 202 may then check the key identifier information to determine whether the chunk key is encrypted with the data secret key or the deduplication secret key. Where the chunk key is encrypted with the deduplication secret key, the chunk key, such as key f[i], is extracted by decrypting the returned chunk key pack with the deduplication secret key. For example, the chunk key pack[i].f may be decrypted with deduplication secret key kd. Where the chunk key is encrypted with the data secret key, the chunk key is extracted by decrypting the returned chunk key pack with the data secret key associated with the location in the read request. For example, the chunk key pack[i].f may be decrypted with one of data secret keys k0, k1, or k2, whichever is associated with location L0. Once decrypted, clear text of each data chunk is generated by decrypting each data chunk with an associated chunk key. For example, clear text of data chunk[i].d may be produced by decrypting the encrypted data pack[i].d with chunk secret key f[i]. Once the data chunks have been decrypted, the host 202 determines a fingerprint fc for the clear text of the data chunks. Original fingerprints for the data chunks are compared to the newly generated fingerprint fc. An original fingerprint may be a fingerprint returned by the storage system and decrypted with the fingerprint secret key.

In operation 660, the host 202 determines the original fingerprint and the newly generated fingerprints are not equal. In such instances, the host 202 compares the original fingerprint send from the storage system 204 and the fingerprint which has just been computed or generated. If the original fingerprints and newly generated fingerprints are not equal a fingerprint error is returned. The fingerprint error may generate a notification to be presented at the host 202. In some instances, the fingerprint error terminates processing of the response to the read request.

In operation 670, the host 202 determines the original fingerprint and the newly generated fingerprints are equal. If the original fingerprints and newly generated fingerprints are equal, the host validates the clear text of data chunks and the data chunks received in the response to the read request are loaded into a buffer. Where the original fingerprint and newly generated fingerprint for a given data chunk are determined to be equal, the host 202 may repeat operation 640 for each remaining data chunk within the response to the read request. Once all of the data chunks have been processed and verified by comparison of fingerprints, the data for location L0 is assembled in the buffer and returned for presentation on the host 202.

TABLE 1

Host Key Group g0

| dct flag | | 0 |
|---|---|---|
| key | kID | Type |
| k0 | kid.k0 | data |
| k1 | kid.k1 | data |
| k2 | kid.k2 | data |
| kd | kid.kd | dedup |

TABLE 2

Host Key Group g1

| dct flag | | 0 |
|---|---|---|
| key | kID | Type |
| k5 | kid.k5 | data |
| k6 | kid.k6 | data |
| kd2 | kid.kd2 | dedup |

Tables 1 and 2 depict example sets of key group information on the host 202. The set of key group information may be sent to the storage system 204. A fingerprint key is not shown, but may be included. Table 1 shows information key group g0. Key group g0 may include a dct flag representing deduplication with clear text. The dct flag having a value of zero indicates that deduplication with clear text data is not allowed. Since deduplication with clear text data is not allowed in Table 1, the fingerprint key associated with key group g0 may be used to encrypt fingerprints for data chunks. Table 1 may further include data secret keys k0, k1, and k2, and associated key identifiers and data type, a deduplication secret key kd with associated key identifier and a type of deduplication. Table 2 depicts key group information for key group g1. Key group g1 may include two data secret keys and a distinct deduplication secret key. Clear text data chunks written from key group g0 will not deduplicate against clear text data chunks written from key group g1.

TABLE 3

| Fing | Host | Key encode ID | Access ID | Ref count | Location | Enc chunk key |
|---|---|---|---|---|---|---|
| S3.0 | 1 | kid.k1 | kid.k1 | 1 | L1 | F0 |
| S4.0 | 1 | kid.k1 | kid.k1 | 1 | L2 | F1 |

Table 3 shows an example of storage chunk metadata. The storage chunk metadata may be generated following a write of data M0 to location L0, under key group g0 using the key identifier kid.k1, shown above in Table 1. The fingerprint column depicts stored fingerprint data. The notation is fingerprint.group number. The notation indicates that the fingerprint is encrypted using the key group 0 fingerprint key. In this example, a distinct value is generated from the clear text fingerprint and from fingerprints using other key groups. The host column indicates an identification of the host owning the data chunk. The key encode ID column indicates a key identifier used to encrypt the associated chunk key. The access ID column includes information on all the key identifiers allowed to access the data. The ref count column contains reference counts for each access key. The location column shows a location on the chunk storage 244 containing the data chunk. The enc chunk key column contains the encrypted chunk key for the associated data chunk. In some instances, metadata (e.g., encrypted chunk key and key encode ID) is stored with the data chunk. The metadata may also be stored separately.

As shown in Table 3, the data M0 includes two data chunks. The two data chunks include one with clear text data, d3, and clear text fingerprint, S3. The two data chunks also include one with clear text data, d4, and clear text fingerprint, S4. As shown with a first write, chunk keys, F0 and F1, are encrypted using the data secret key associated with key identifier kid.k1.

TABLE 4

| Fing | Host | Key encode ID | Access ID | Ref count | Location | Enc chunk key |
|---|---|---|---|---|---|---|
| S3.0 | 1 | kid.kd | kid.k1 | 1 | L5 | F2 |
|  |  |  | kid.k0 | 1 |  |  |
| S4.0 | 1 | kid.k1 | kid.k1 | 1 | L2 | F1 |
| S0.0 | 1 | kid.k0 | kid.k0 | 1 | L3 | F3 |
| S2.0 | 1 | kid.k0 | kid.k0 | 1 | L4 | F4 |

Table 4 shows changes to chunk metadata following subsequent writes of data M1 to location L1. The subsequent writes may be performed using key group g0 and key identifier kid.k0. As shown in Table 4, data M1 includes three data chunks, (d0,S0), (d2,S2), and (d3,S3). Data chunks (d0, S0) and (d2,S2) are associated with encrypted fingerprints S0.0 and S2.0 respectively.

In Table 4, data chunk (d3,S3) has encrypted fingerprint S3.0 using key group g0. As such, data chunk (d3,S3) matches the first entry in the data chunk metadata and deduplication. As a first deduplication of S3.0, the new chunk data will be stored, and the encoded key identifier is updated, as described in more detail below. The new data chunk may be stored at location L5. The new chunk may be encrypted with a new chunk key, such that the chunk key is changed to F2. The encrypted chunk key is encrypted with the deduplication secret key associated with key identifier kid.kd. The access Id list and reference count for the chunk are then updated to include kid.k0, the key identifier writing the data chunk. The prior copy of the chunk, at location L1, may be deleted during deduplication.

TABLE 5

| Fing | Host | Key encode ID | Access ID | Ref count | Location | Enc chunk key |
|---|---|---|---|---|---|---|
| S3.0 | 1 | kid.kd | kid.k1 | 1 | L5 | F2 |
|  |  |  | kid.k0 | 2 |  |  |
| S4.0 | 1 | kid.k1 | kid.k1 | 1 | L2 | F1 |
| S0.0 | 1 | kid.k0 | kid.k0 | 1 | L3 | F3 |
| S2.0 | 1 | kid.k0 | kid.k0 | 1 | L4 | F4 |
| S5.0 | 1 | kid.k0 | kid.k0 | 1 | L6 | F5 |

Table 5 depicts changes to chunk metadata from Table 4 following a subsequent write of data M2 to location L2 using key group g0 and key identifier kid.k0. As shown, the data M2 includes two data chunks of (d5,S5) and (d3,S3). Data chunk (d5,S5) is a new data chunk and has encrypted fingerprint S5.0. Data chunk (d3,S3) has encrypted fingerprint S3.0 since this data chunk is from key group g0. The data chunk (d3,S3) matches the first entry of Table 4 in the chunk metadata and deduplication. Since the data chunk (d3,S3) has a non-zero reference count in key Identifier kid.k0, the reference count is incremented and the chunk data remains unchanged.

TABLE 6

| Fing | Host | Key encode ID | Access ID | Ref count | Location | Enc chunk key |
|------|------|---------------|-----------|-----------|----------|---------------|
| S3.0 | 1 | kid.kd | kid.k1 | 1 | L5 | F2 |
|      |   |        | kid.k0 | 2 |    |    |
| S4.0 | 1 | kid.k1 | kid.k1 | 1 | L2 | F1 |
| S0.0 | 1 | kid.k0 | kid.k0 | 1 | L3 | F3 |
| S2.0 | 1 | kid.k0 | kid.k0 | 1 | L4 | F4 |
| S5.0 | 1 | kid.k0 | kid.k0 | 1 | L6 | F5 |
| S1.1 | 1 | kid.k5 | kid.k5 | 1 | L7 | F6 |
| S2.1 | 1 | kid.k5 | kid.k5 | 1 | L8 | F7 |

Table 6 depicts changes to the chunk metadata following a subsequent write of data M3 to location L3 under key group g1 using key identifier kid.k5. the data M3 includes two data chunks, (d1,S1) and (d2,S2). Data chunk (d1,S1) has encrypted fingerprints S1.1. Data chunk (d2,S2) has the same clear text data and signature as a prior chunk from key group g0. However, the fingerprints are different for the two groups. Thus, the encrypted fingerprints S2.0 and S2.1 will not match and the respective data chunks will not deduplicate.

As shown in Tables 1-6, maintaining a reference count for each key identifier for each data chunk may be beneficial. A non-zero reference count in a given key identifier may thus trigger reading of the data chunk. If a data chunk has a positive reference count, the count may be decremented each time a chunk reference is deleted until the counter reaches zero. At zero, the key identifier may be removed from the access key identifier list for the data chunk. Other key identifiers may have non-zero reference counts and remain unaffected by the decrementing of another key identifier.

In some embodiments, network bandwidth used by the present disclosure is reduced by sending data chunk fingerprint information separately from the chunk data and the chunk keys. In such embodiments, the chunk fingerprints may be initially transmitted. The storage system 204 may determine, based on the fingerprint information, whether the data chunk has been previously deduplicated. In these instances, the data chunk may not be sent, thereby reducing bandwidth for the communication. The storage system 204 may also inform the host 202 which key should be used for the encryption key of the data chunk and which key identifier should be used to encrypt the chunk key. The storage system 204 may thereby reduce encryption operations on the host 202. In some embodiments, these changes may be performed at a packing stage for the data chunks.

Figure 7:
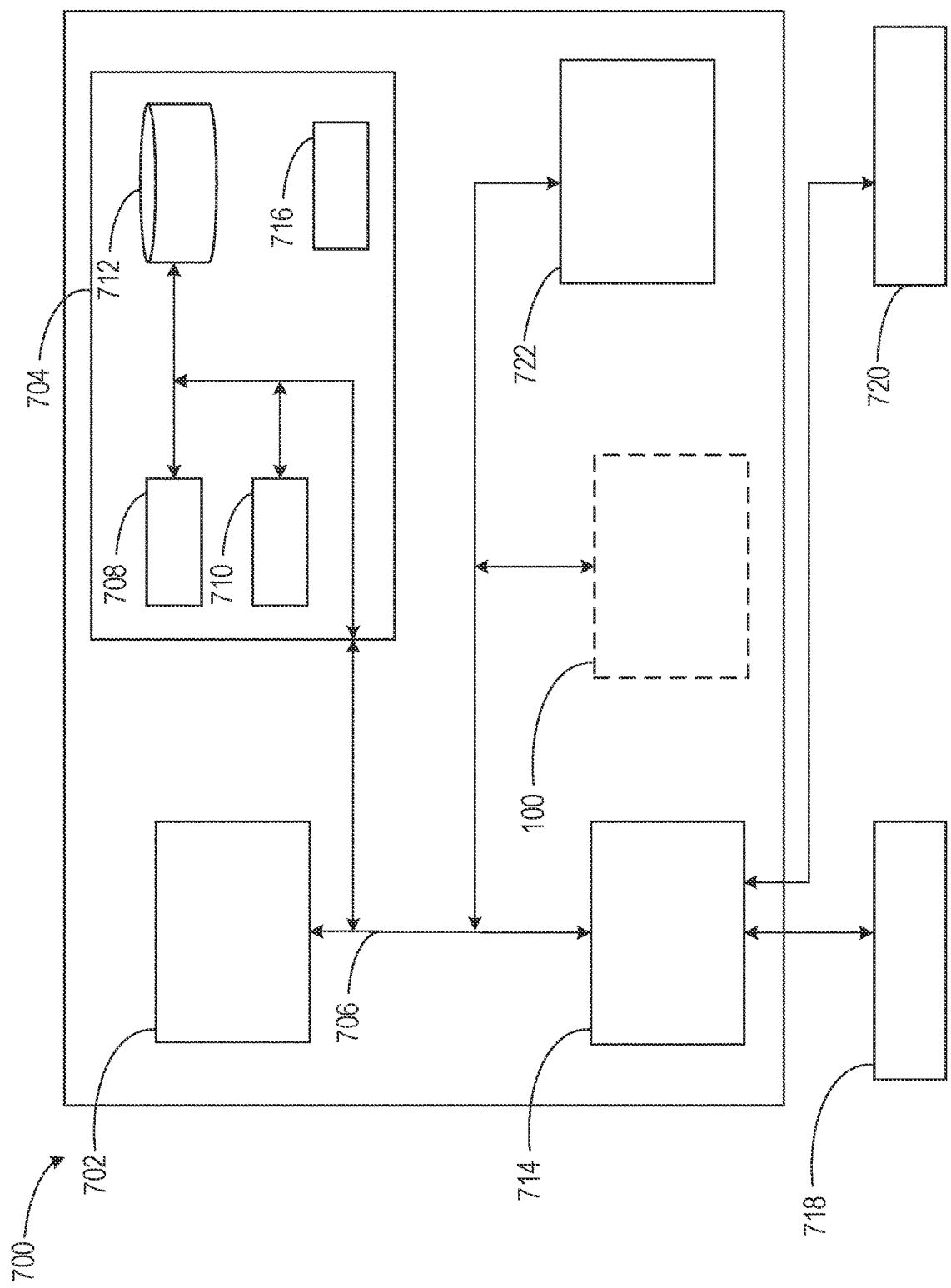
FIG. 7 depicts a block diagram of a computing system for implementing key in lockbox encrypted data deduplication and transmission, according to at least one embodiment.

Embodiments of the present disclosure may be implemented together with virtually any type of computer, regardless of the platform is suitable for storing and/or executing program code. FIG. 7 shows, as an example, a computing system 700 (e.g., cloud computing system) suitable for executing program code related to the methods disclosed herein and for key in lockbox encrypted data deduplication and transmission.

The computing system 700 is only one example of a suitable computer system and is not intended to suggest any limitation as to the scope of use or functionality of embodiments of the present disclosure described herein, regardless of whether the computer system 700 is capable of being implemented and/or performing any of the functionality set forth hereinabove. In the computer system 700, there are components, which are operational with numerous other general purpose or special purpose computing system environments or configurations. Examples of well-known computing systems, environments, and/or configurations that may be suitable for use with computer system/server 700 include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like. Computer system/server 700 may be described in the general context of computer system-executable instructions, such as program modules, being executed by a computer system 700. Generally, program modules may include routines, programs, objects, components, logic, data structures, and so on that perform particular tasks or implement particular abstract data types. Computer system/server 700 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 700 is shown in the form of a general-purpose computing device. The components of computer system/server 700 may include, but are not limited to, one or more processors 702 (e.g., processing units), a system memory 704 (e.g., a computer-readable storage medium coupled to the one or more processors), and a bus 706 that couple various system components including system memory 704 to the processor 702. Bus 706 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 700 typically includes a variety of computer system readable media. Such media may be any available media that is accessible by computer system/server 700, and it includes both, volatile and non-volatile media, removable and non-removable media.

The system memory 704 may include computer system readable media in the form of volatile memory, such as random-access memory (RAM) 708 and/or cache memory 710. Computer system/server 700 may further include other removable/non-removable, volatile/non-volatile computer system storage media. By way of example only, a storage system 712 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 706 by one or more data media interfaces. As will be further depicted and described below, the system memory 704 may include at least one program product having a set (e.g., at least one) of program modules that are configured to carry out the functions of embodiments of the present disclosure.

The program/utility, having a set (at least one) of program modules 716, may be stored in the system memory 704 by way of example, and not limiting, as well as an operating system, one or more application programs, other program modules, and program data. Program modules may include one or more of the meta-generator component 110, the chunker component 120, the encryption component 130, the key generator component 140, the request component 150, and the transmission component 160, which are illustrated in FIG. 1. Each of the operating systems, one or more application programs, other program modules, and program data or some combination thereof, may include an implementation of a networking environment. Program modules 716 generally carry out the functions and/or methodologies of embodiments of the present disclosure, as described herein.

The computer system/server 700 may also communicate with one or more external devices 718 such as a keyboard, a pointing device, a display 720, etc.; one or more devices that enable a user to interact with computer system/server 700; and/or any devices (e.g., network card, modem, etc.) that enable computer system/server 700 to communicate with one or more other computing devices. Such communication can occur via Input/Output (I/O) interfaces 714. Still yet, computer system/server 700 may communicate with one or more networks such as a local area network (LAN), a general wide area network (WAN), and/or a public network (e.g., the Internet) via network adapter 722. As depicted, network adapter 722 may communicate with the other components of computer system/server 700 via bus 706. It should be understood that, although not shown, other hardware and/or software components could be used in conjunction with computer system/server 700. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models may include private cloud, community cloud, public cloud, and hybrid cloud. In private cloud, the cloud infrastructure is operated solely for an organization. It may be managed by the organization or a third party and may exist on-premises or off-premises. In community cloud, the cloud infrastructure is shared by several organizations and supports specific community that has shared concerns (e.g., mission, security requirements, policy, and compliance considerations). It may be managed by the organizations or a third party that may exist on-premises or off-premises. In public cloud, the cloud infrastructure is made available to the general public or a large industry group and is owned by an organization selling cloud services. In hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling modularity, and semantic interoperability. At the heart of cloud computing is an infrastructure that includes a network of interconnected nodes.

Figure 8:
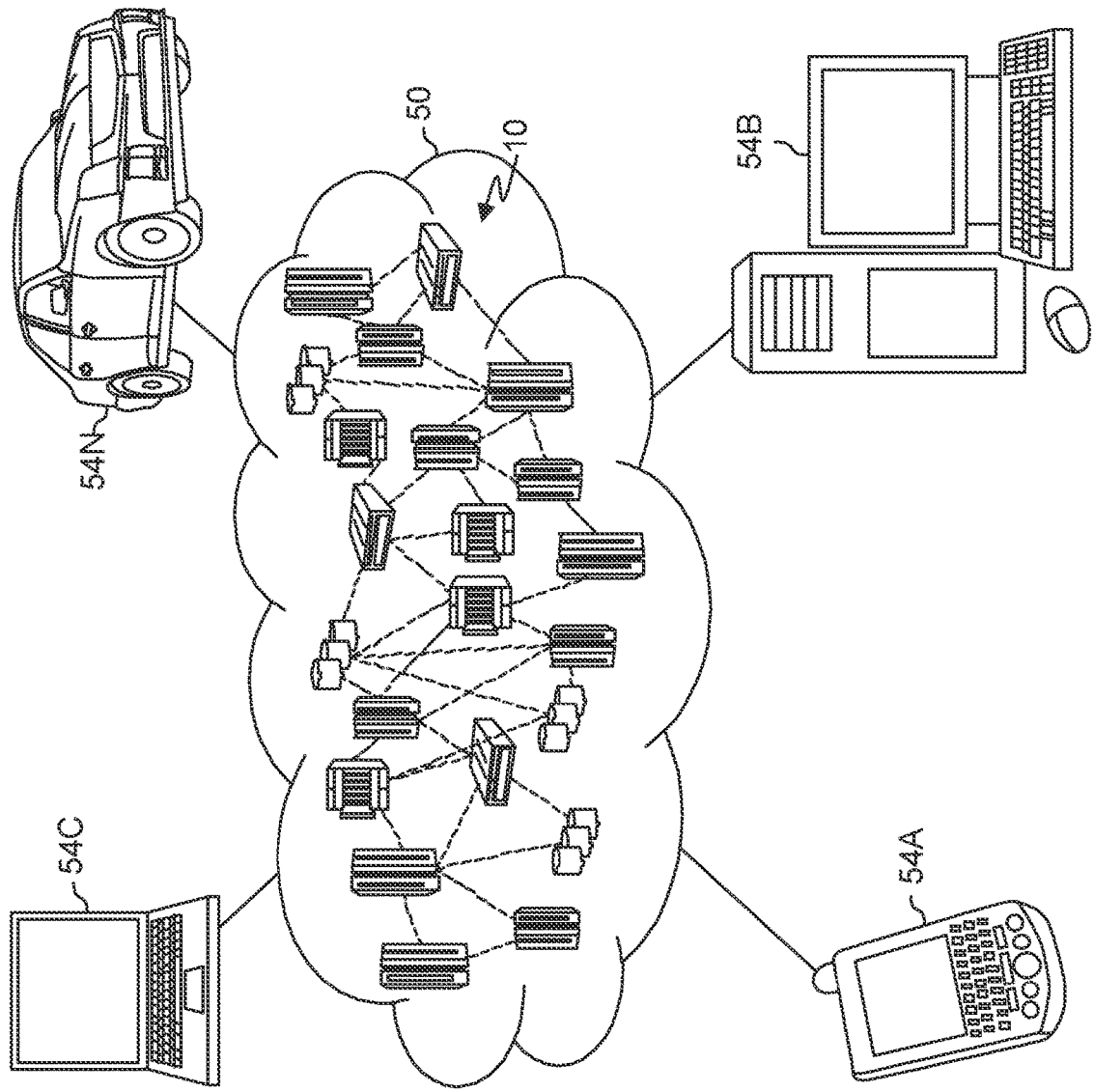
FIG. 8 is a schematic diagram of a cloud computing environment in which concepts of the present disclosure may be implemented, in accordance with an embodiment of the present disclosure.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 9:
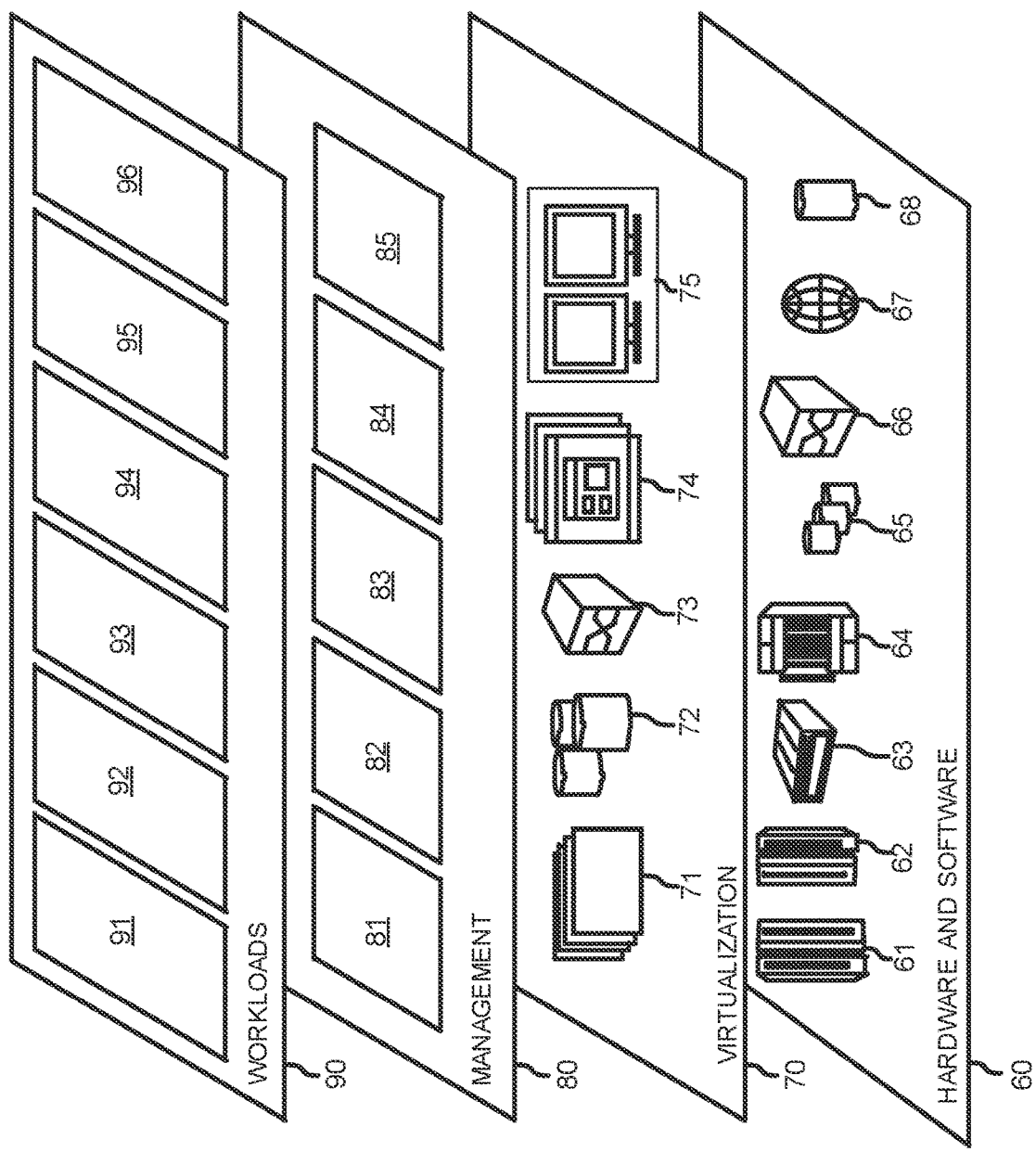
FIG. 9 is a diagram of model layers of a cloud computing environment in which concepts of the present disclosure may be implemented, in accordance with an embodiment of the present disclosure.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and encryption processing 96.

Cloud models may include characteristics including on-demand self-service, broad network access, resource pooling, rapid elasticity, and measured service. In on-demand self-service a cloud consumer may unilaterally provision computing capabilities such as server time and network storage, as needed automatically without requiring human interaction with the service's provider. In broad network access, capabilities are available over a network and accessed through standard mechanisms that promote use by heterogeneous thin or thick client platforms (e.g., mobile phones, laptops, and PDAs). In resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). In rapid elasticity, capabilities can be rapidly and elastically provisioned, in some cases automatically, to quickly scale out and rapidly released to quickly scale in. To the consumer, the capabilities available for provisioning often appear to be unlimited and can be purchased in any quantity at any time. In measured service, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:
collecting, by a host, information on deduplication opportunities for chunks of data, wherein the information identifies a write data chunk that has been duplicated;
generating, based on the write data chunk, a chunk signature;
encrypting the chunk signature with a data secret key;
generating, based on the write data chunk, a chunk key for the duplicated write data chunk, wherein the chunk key is unique to the write data chunk;
encrypting, by the host in communication with a storage system, the write data chunk using the chunk key to generate an encrypted data chunk;
encrypting, by the host, the chunk key with a deduplication secret key to generate a first encrypted key, wherein the deduplication secret key is used for decrypting deduplicated data chunks;
encrypting, by the host, the chunk key with the data secret key to generate a second encrypted key, wherein the data secret key is not shared with the storage system;
transmitting, by the host, the deduplication information, the encrypted data chunk, the encrypted chunk signature, the first encrypted key, and the second encrypted key to the storage system;
determining, based on finding the encrypted chunk signature in the storage system, that the encrypted write data chunk has previously been stored on the storage system; and
storing, based on the determining, the second encrypted key on the storage system.

2. The method of claim 1, further comprising:
generating, by the host, a fingerprint of the write data chunk; and
transmitting, by the host, the fingerprint to the storage system.

3. The method of claim 2, further comprising:
encrypting, by the host, the fingerprint of the write data chunk.

4. The method of claim 3, wherein the fingerprint is encrypted using a deduplication secret key.

5. The method of claim 1, further comprising:
generating, by the host, a data package for transmission to the storage system, the data package including at least one selected from the group consisting of the encrypted data chunk, the first encrypted key, and the second encrypted key.

6. The method of claim 5, wherein the data package is generated for transmission to the storage system based on a network characteristic of a communications network.

7. The method of claim 6, wherein the network characteristic is a bandwidth of the communications network between the host and the storage system, and wherein the bandwidth is below a bandwidth threshold.

8. A system, comprising:
one or more processors; and
a computer-readable storage medium, coupled to the one or more processors, storing program instructions that, when executed by the one or more processors, cause the one or more processors to perform operations comprising:
collecting, by a host, information on deduplication opportunities for chunks of data, wherein the information identifies a write data chunk that has been duplicated;
generating, based on the write data chunk, a chunk signature;
encrypting the chunk signature with a data secret key;
generating, based on the write data chunk, a chunk key for the duplicated write data chunk, wherein the chunk key is unique to the write data chunk;
encrypting, by the host in communication with a storage system, the write data chunk using the chunk key to generate an encrypted data chunk;
encrypting, by the host, the chunk key with a fingerprint key to generate a first encrypted key;
encrypting, by the host, the chunk key with a data secret key to generate a second encrypted key, wherein the data secret key is not shared with the storage system;
transmitting, by the host, the deduplication information, the encrypted data chunk, the encrypted chunk signature, the first encrypted key, and the second encrypted key to the storage system;
determining, based on finding the encrypted chunk signature in the storage system, that the encrypted write data chunk has previously been stored on the storage system; and
storing, based on the determining, the second encrypted key on the storage system.

9. The system of claim 8, further comprising:
generating, by the host, a fingerprint of the write data chunk; and
transmitting, by the host, the fingerprint to the storage system.

10. The system of claim 9, further comprising:
encrypting, by the host, the fingerprint of the write data chunk.

11. The system of claim 10, wherein the fingerprint is encrypted using a deduplication secret key.

12. The system of claim 8, further comprising:
generating, by the host, a data package for transmission to the storage system, the data package including at least one selected from the group consisting of the encrypted data chunk, the first encrypted key, and the second encrypted key.

13. The system of claim 12, wherein the data package is generated for transmission to the storage system based on a network characteristic of a communications network.

14. The system of claim 13, wherein the network characteristic is a bandwidth of the communications network between the host and the storage system, and wherein the bandwidth is below a bandwidth threshold.

15. A computer program product comprising a non-transitory computer readable storage medium having program instructions embodied therewith, the program instructions being executable by one or more processors to cause the one or more processors to perform operations comprising:
collecting, by a host, information on deduplication opportunities for chunks of data, wherein the information identifies a write data chunk that has been duplicated;
generating, based on the write data chunk, a chunk signature;
encrypting the chunk signature with a data secret key;
generating, based on the write data chunk, a chunk key for the duplicated write data chunk, wherein the chunk key is unique to the write data chunk;
encrypting, by the host in communication with a storage system, the write data chunk using the chunk key to generate an encrypted data chunk;
encrypting, by the host, the chunk key with a fingerprint key to generate a first encrypted key;

encrypting, by the host, the chunk key with a data secret key to generate a second encrypted key, wherein the data secret key is not shared with the storage system;

transmitting, by the host, the deduplication information, the encrypted data chunk, the first encrypted key, and the second encrypted key to the storage system;

determining, based on finding the encrypted chunk signature in the storage system, that the encrypted write data chunk has previously been stored on the storage system; and storing, based on the determining, the second encrypted key on the storage system.

16. The computer program product of claim 15, further comprising:

generating, by the host, a fingerprint of the write data chunk; and transmitting, by the host, the fingerprint to the storage system.

17. The computer program product of claim 16, further comprising:

encrypting, by the host, the fingerprint of the write data chunk.

18. The computer program product of claim 17, wherein the fingerprint is encrypted using a deduplication secret key.

19. The computer program product of claim 15, further comprising:

generating, by the host, a data package for transmission to the storage system, the data package including at least one selected from the group consisting of the encrypted data chunk, the first encrypted key, and the second encrypted key.

20. The computer program product of claim 19, wherein the data package is generated for transmission to the storage system based on a network characteristic of a communications network and wherein the network characteristic is a bandwidth of the communications network between the host and the storage system, and wherein the bandwidth is below a bandwidth threshold.

* * * * *